United States Patent
Che et al.

(10) Patent No.: US 7,508,628 B2
(45) Date of Patent: Mar. 24, 2009

(54) WINGED POLE AND SHIELD STRUCTURE FOR REDUCING STRAY FIELD IN A PERPENDICULAR WRITE HEAD

(75) Inventors: Xiaodong Che, Saratoga, CA (US); Hardayal Singh Gill, Palo Alto, CA (US); Wen-chien Hsiao, San Jose, CA (US); Yangsheng Luo, Fremont, CA (US); Xiaoyu Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 677 days.

(21) Appl. No.: 10/976,478

(22) Filed: Oct. 29, 2004

(65) Prior Publication Data

US 2006/0092569 A1    May 4, 2006

(51) Int. Cl.
*G11B 5/33* (2006.01)
*G11B 5/127* (2006.01)

(52) U.S. Cl. .................... 360/125.16; 360/319
(58) Field of Classification Search ........ None
See application file for complete search history.

(56) References Cited

U.S. PATENT DOCUMENTS

| | | | |
|---|---|---|---|
| 4,725,909 A | 2/1988 | Kawai | 360/126 |
| 5,208,715 A * | 5/1993 | Mowry | 360/319 |
| 6,032,353 A | 3/2000 | Hiner et al. | 29/603.14 |
| 6,097,578 A * | 8/2000 | Pokhil | 360/319 |
| 6,122,144 A * | 9/2000 | Chang et al. | 360/122 |
| 6,826,014 B2 * | 11/2004 | Lam et al. | 360/126 |
| 6,888,702 B2 * | 5/2005 | Sato et al. | 360/319 |
| 6,914,749 B2 * | 7/2005 | Chang et al. | 360/135 |
| 2002/0053130 A1 | 5/2002 | Sasaki | 29/603.15 |
| 2005/0264930 A1 * | 12/2005 | Gider et al. | 360/125 |

OTHER PUBLICATIONS

Copy of EP Communication and Search Report from EP Application No. 05254251.1-2210 mailed on Aug. 20, 2007.

* cited by examiner

*Primary Examiner*—David D Davis
(74) *Attorney, Agent, or Firm*—Zilka-Kotab, PC

(57) ABSTRACT

A magnetic structure for use in a magnetic recording head, the structure having improved resistance to stray field writing. The magnetic structure can be for example a magnetic shield or a return pole of a perpendicular write element. The structure includes a main body portion which may have a generally rectangular configuration, and first and second wing portions extending laterally from the sides of the body at or near the ABS. The wing portions have a depth measured perpendicular to the ABS that is significantly less than the depth of the body portion (preferably less than 25 percent of the body portion). The wing portions may also have notches formed in their ABS edges. The wings conduct flux from the ABS edge of the body portion and create a flux choking effect for magnetic flux flowing into the wings.

27 Claims, 6 Drawing Sheets

WINGED POLE AND SHIELD STRUCTURE FOR REDUCING STRAY FIELD IN A PERPENDICULAR WRITE HEAD

FIELD OF THE INVENTION

The present invention relates to current perpendicular magnetic recording and more particularly to a novel magnetic shield and pole design having reduced stray field sensitivity.

BACKGROUND OF THE INVENTION

The present invention is related to the following commonly assigned patent applications: Winged Design For Reducing Corner Stray Magnetic Fields, Ser. No. 10/977,315; and Single Notched Shield and Pole Structure With Slanted Wing For Perpendicular Recording, Ser. No. 10/976,479.

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One problem that has arisen as a result of such perpendicular recording systems is that the magnetic medium is particularly susceptible to stray magnetic fields. Relatively large magnetic structures such as the magnetic shields used magnetically isolate the read sensor act as large magnetic antennas. As magnetic antennas, these structures collect and concentrate magnetic fields from a myriad of extraneous, external sources, such as cellular phones, airport security devices and many other such sources.

The magnetically soft underlayer of the medium in a perpendicular magnetic recording system is particularly susceptible to picking up magnetic fields emanating from such magnetic structures. This phenomenon can be understood more clearly with reference to FIG. 1, which shows a magnetic structure 102 which could be for example a magnetic shield or some other structure such as a magnetic pole of a write head. The magnetic structure 102 acts as a magnetic antenna, collecting the extraneous magnetic fields, indicated by field lines 104. This causes a resulting magnetic flux within the magnetic structure, the magnetic flux being represented by flux lines 106. As those skilled in the art will appreciate the lines 104 depict magnetic fields as they travel through space, whereas the lines 106 indicate a resulting magnetic flux traveling through a magnetic medium such as the structure 102. It should be pointed out that, while the flux 106 is being described as resulting from a vertical field, a similar result would occur as from the presence of a field canted at some other angle.

The magnetic flux 102 becomes highly concentrated at the corners of the magnetic structure 102. As a result, a concentrated magnetic field 106 emits from the corners of the magnetic structure 102 traveling to the soft underlayer 108 of the nearby magnetic medium 110. The soft magnetic properties of the magnetically soft underlayer, cause it to strongly attract and absorb magnetic fields. In fact an environmental stray field of just 50 Gauss can result in a field 106 as large as 6000 Gauss being emitted from the magnetic structure 102 While traveling to the soft underlayer 108, this concentrated magnetic field 106 passes through the magnetically hard top layer 112, and in the processes magnetizes the top layer 112. By doing so, the magnetic field 106 completely erases any data that may have been previously recorded on the top layer 112. As can be appreciated, this is very problematic.

Although magnetic structures such as magnetic shields and magnetic poles exhibit the problem described above, such magnetic structures are a necessary part of magnetic recording head and cannot simply be eliminated. Therefore, there is a strong felt need for a design for magnetic structures that can allow efficient performance of the magnetic structure for its intended purpose (such as a magnetic shield) while avoiding such unwanted stray field writing. Such a solution to the above problem would preferably not involve the addition of significant processes complexity and would allow the use of currently available desired magnetic materials.

SUMMARY OF THE INVENTION

The present invention provides a magnetic structure for use in a read or write head of a magnetic recording system. The magnetic structure has a configuration that prevents stray field writing and includes a main body portion and first and second laterally extending wings that extend laterally outward from the main body portion at the AB end of the main body portion. The wing portions each have a depth measured perpendicular to the ABS that is less than ¼ of the dept of the body portion also as measured perpendicular to the ABS.

The structure can be for example a magnetic shield or could also be for example a return pole of a perpendicular write head. The wing portions may or may not include notches at their ABS edges, resulting in a wing having an un-notched portion that is exposed to the ABS and a notched portion that is exposed to the ABS and extends to the edge of the wing portion. The choice of whether to notch the wing portions depends upon the type of magnetic fields that the structure is anticipated to experience.

The wings portions of the structure advantageously conduct magnetic flux away from the ABS edge of the main body, thereby preventing stray field writing that would otherwise occur at the ABS edge of the main body. By making the depth of the wing portions small relative to the depth of the main body, the wing portions advantageously provide a flux choking function, thereby preventing stray field writing at the outer corners of the wing portions.

The flux choking occurs because the wings can become magnetically saturated where the flux travels from the main body to the wing portion. This saturation advantageously allows small, harmless amounts of magnetic flux to leak out at the ABS, thereby reducing the amount of magnetic flux that reaches the ends of the wings.

The invention is helpful in reducing the concentration of flux (and thus the fields) at the corners that are exposed on the active surface of the head. The overall geometry and magnetic properties of the head structure and soft underlayer are the other factors that determine the absolute fields that appear at these corners and that are induced in response to write-current and/or external field. The relative sensitivities to write current and to external field components along various directions can be adjusted by changing the geometry of the head structure. For example, wider wings tend to decrease (improve) sensitivity to 'cross-track' external fields but increase (aggravate) sensitivity to "perpendicular" external fields. The ability to make such trade-offs by tuning the geometry of the head structure is also very important in maximizing overall robustness of the recording system against external fields. These and other features and advantages of the invention will become apparent upon reading the following Detailed Description, in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
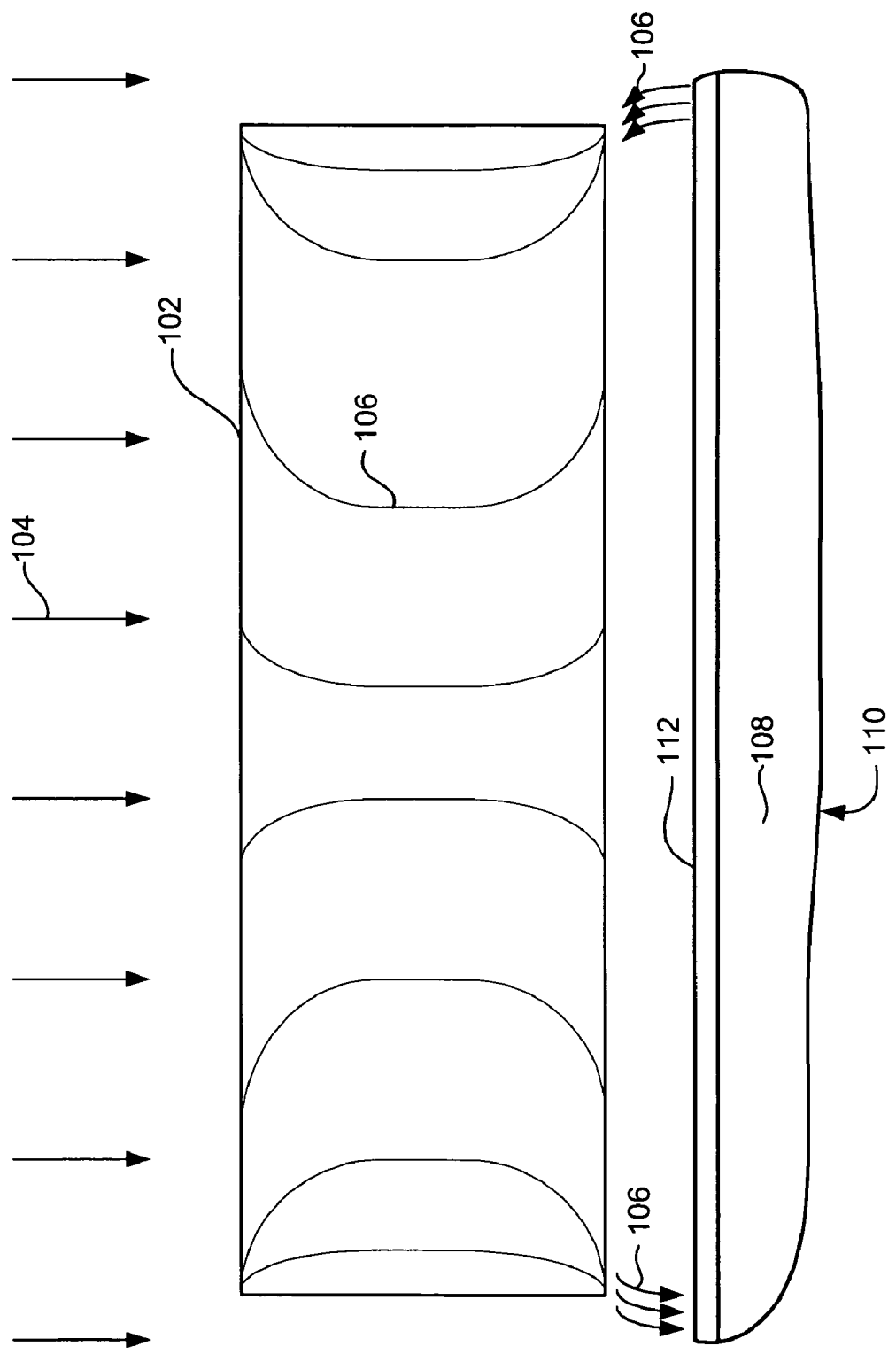
FIG. 1 is a view of a magnetic structure illustrating the effect of an environmental magnetic field on the magnetic structure and adjacent magnetic medium.
Figure 2:
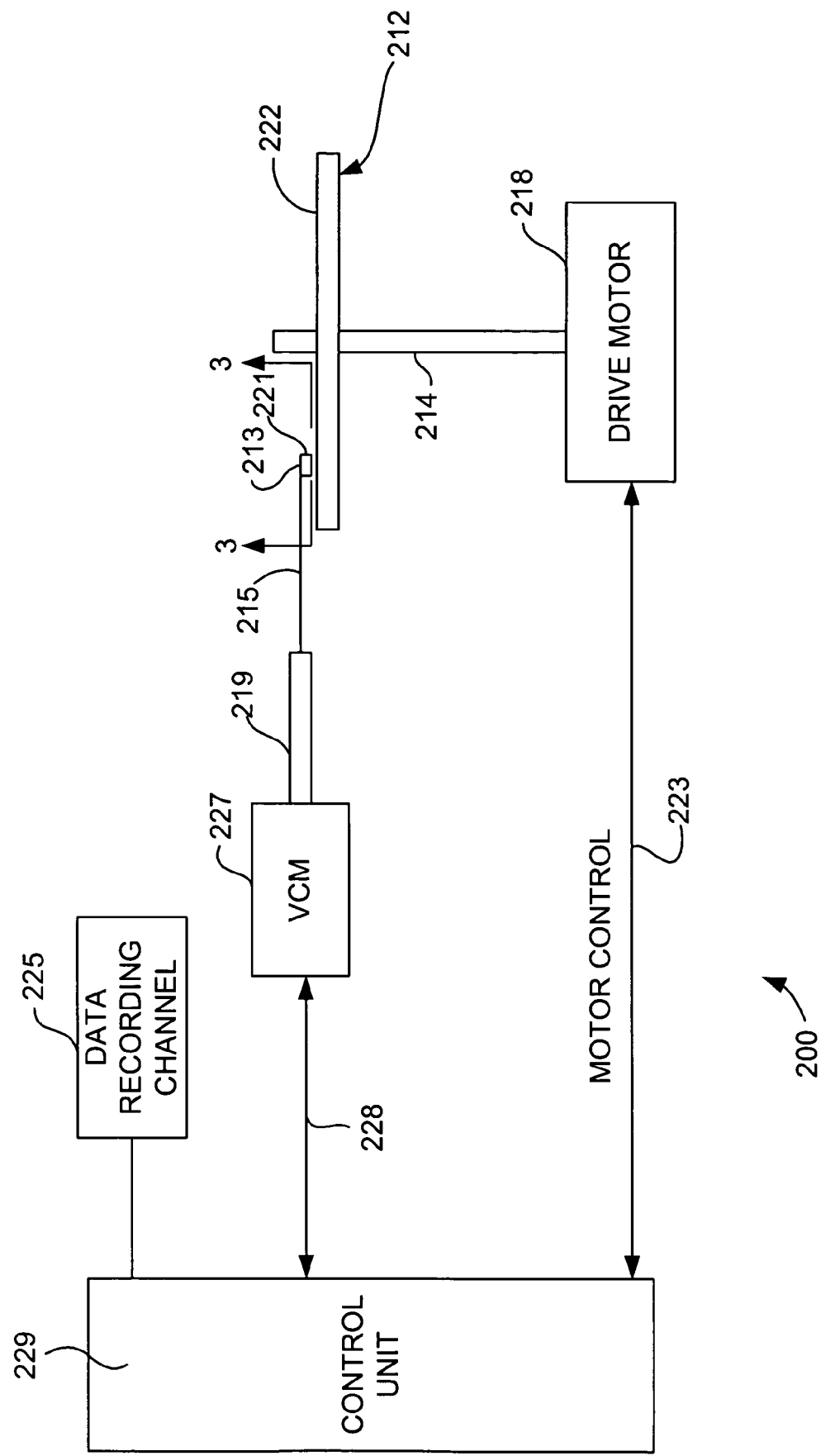
FIG. 2 is a schematic illustration of a disk drive system in which the invention might be embodied.

Referring now to FIG. 2, there is shown a disk drive 200 embodying this invention. As shown in FIG. 2, at least one rotatable magnetic disk 212 is supported on a spindle 214 and rotated by a disk drive motor 218. The magnetic recording on each disk is in the form of annular patterns of concentric data tracks (not shown) on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215. The suspension 215 provides a slight spring force which biases slider 213 against the disk surface 222. Each actuator arm 219 is attached to an actuator means 227. The actuator means 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of the magnetic disk 212 generates an air bearing between the slider 213 and the disk surface 222 which exerts an upward force or lift on the slider. The air bearing thus counter-balances the slight spring force of suspension 215 and supports slider 213 off and slightly above the disk surface by a small, substantially constant spacing during normal operation.

The various components of the disk storage system are controlled in operation by control signals generated by control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
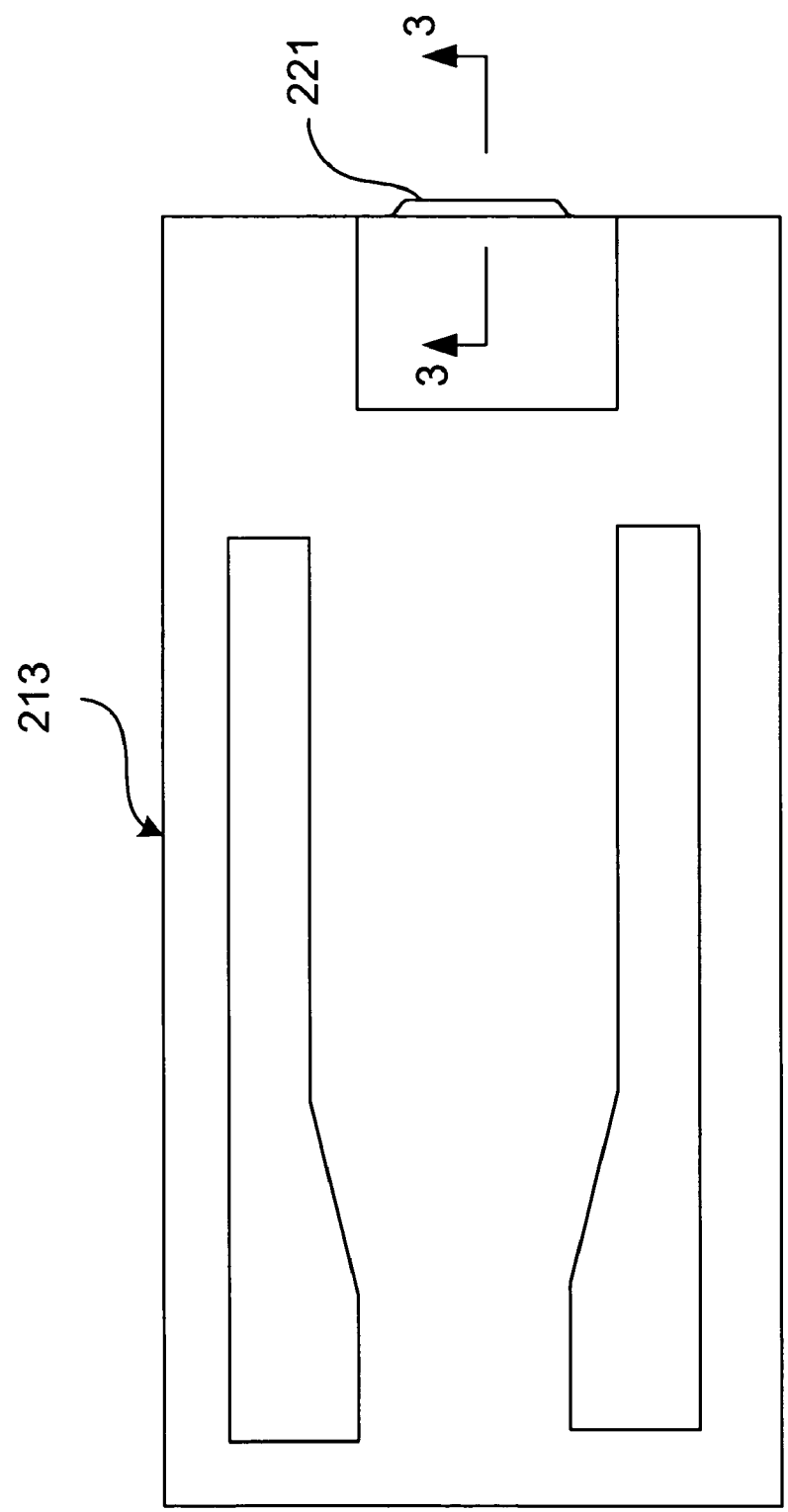
FIG. 3 is an ABS view of a slider, taken from line 3-3 of FIG. 2, illustrating the location of a magnetic head thereon.

With reference to FIG. 3, the orientation of the magnetic head 221 in a slider 213 can be seen in more detail. FIG. 3 is an ABS view of the slider 213, and as can be seen the magnetic head including an inductive write head and a read sensor, is located at a trailing edge of the slider. The above description of a typical magnetic disk storage system, and the accompanying illustration of FIG. 2 are for representation purposes only. It should be apparent that disk storage systems may contain a large number of disks and actuators, and each actuator may support a number of sliders.

Figure 4:
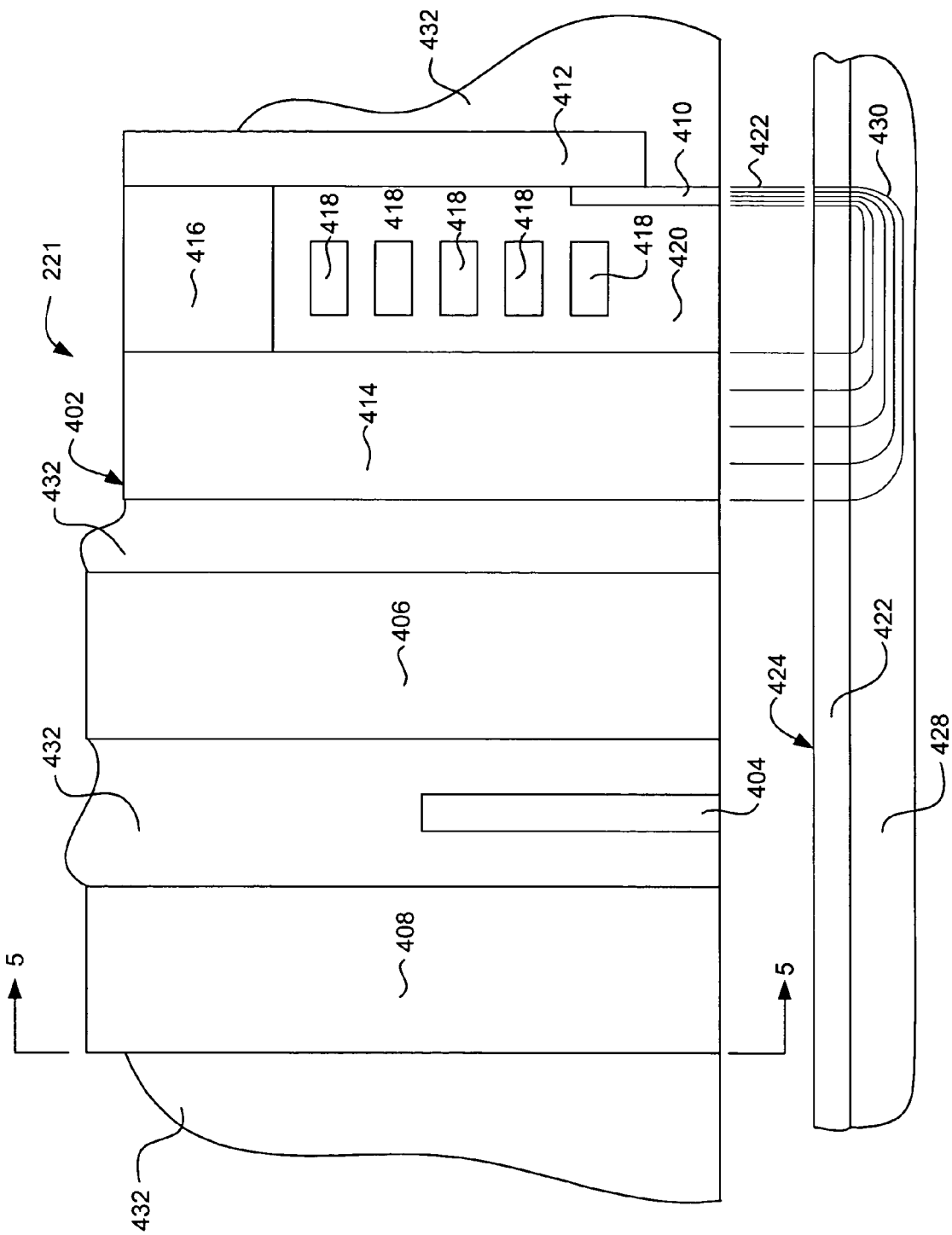
FIG. 4 is an ABS view, taken from line 4-4 of FIG. 3 and rotated 180 degrees, of a magnetic head according to an embodiment of the present.

With reference now to FIG. 4, the magnetic head 221 for use in a perpendicular magnetic recording system is described. The head 221 includes a write element 402 and a read sensor 404. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 404 could be another type of sensor such as a current in plane (CIP) GMR sensor or, a tunnel junction sensor (TMR) or some other type of sensor. The sensor 404 is located between and insulated from first and second magnetic shields 406, 408. The magnetic shields, which can be constructed of for example CoFe or NiFe, absorb magnetic fields, such as those from uptrack or down track data signals, ensuring that the read sensor 404 only detects the desired data track located between the shields 406, 408.

With continued reference to FIG. 4, the write element 402 includes a write pole 410, that is magnetically connected with a magnetic shaping layer 412. The write pole has a small cross section at the air bearing surface ABS and is constructed of a material having a high saturation, high moment magnetic material such as Co or CoFe. The shaping layer 412 is constructed of a magnetic material such as CoFe or NiFe and has a cross section parallel to the ABS surface that is significantly larger than that of the write pole 410.

The write element 402 also has a return pole 414 that preferably has a surface exposed at the ABS surface and has a cross section parallel with the ABS surface that is much larger than that of the write pole 410. The write pole 414 is magnetically connected with the shaping layer 412 by a back gap portion 416. The return pole 414 and back gap 416 can be constructed of, for example, NiFe, CoFe or some other magnetic material.

An electrically conductive write coil 418, shown in cross section in FIG. 4, passes through the write element 402 between the shaping layer 412, and the return pole 414. The write coil 418 is surrounded by an electrically insulating material 420 that electrically insulates the turns of the coil 418 from one another and electrically isolates the coil 418 from the surrounding magnetic structures 410, 412, 416, 414. When a current passes through the coil 418, the resulting magnetic field causes a magnetic flux to flow through the return pole 414, back gap 416, shaping layer 412 and write pole 410. This magnetic flux causes a write field 422 to be emitted toward an adjacent magnetic medium 424. As described in the background of the invention, the magnetic medium preferably includes a thin magnetically hard top layer 426 and a magnetically softer underlayer 428. The strong, highly concentrated magnetic field from the write pole 410 magnetizes, (ie. fixes the magnetic moment of) the magnetically hard top layer 426, and the resulting magnetic flux 420 travels through the soft underlayer 428. The flux travels to the return pole 414 where it passes back through the magnetically hard top layer 426 toward the return pole 414. As the magnetic flux 430 passes through the top layer 426 to the return pole 414, it is sufficiently spread out and week so as not to affect the magnetization of the magnetically hard top layer 424.

With continued reference to FIG. 4, the areas surrounding the write element 402, shields 406, 408 and the magnetoresistive read element are filled with a non-magnetic, electrically insulating material 432, such as for example alumina (Al$_2$O$_3$). This insulating material 432 can be formed in multiple layers.

Figure 5:
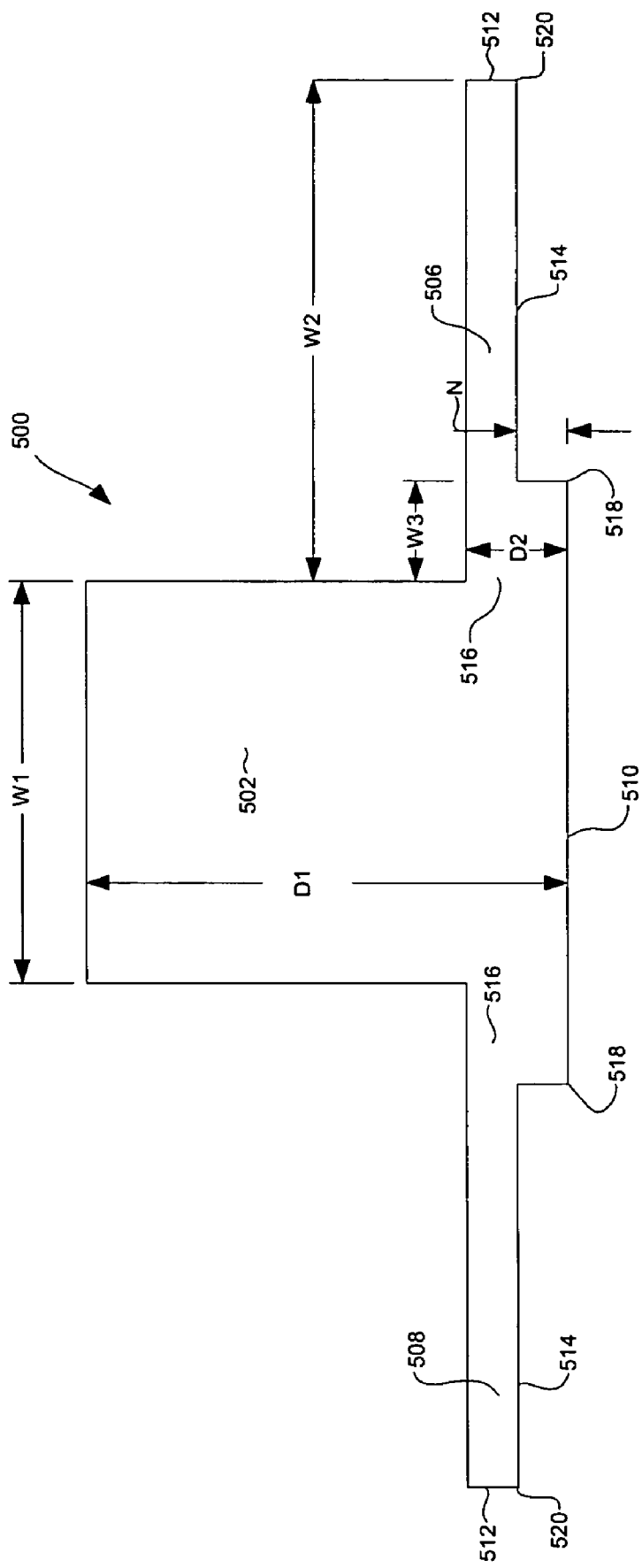
FIG. 5 is a view, taken from line 5-5 of FIG. 4, shown enlarged, of a magnetic structure according to a possible embodiment of the invention.

With reference now to FIG. 5, a magnetic structure 500 having improved resistance to stray field writing is described. The magnetic structure can be for example a magnetic shield 406, 408 (FIG. 4), magnetic return pole 414 (FIG. 5) or any other necessary magnetic structure that might be present in a magnetic head 221 having an air bearing surface (ABS) indicated by dashed line 502. It should be pointed out that the structure could be a shield 408, 406, a return pole 414 or any other structure located in a magnetic head and having a generally rectangular structure.

As discussed above in the background of the invention, environmental magnetic fields, which can be caused by many different sources such as airport security equipment or cellular phones, result in magnetic flux which flows through the shield 500. The flow of magnetic flux through a magnetic structure is strongly affected by the geometry of such of a structure. Lines of flux become greatly concentrated at abrupt features, especially corners of a magnetic structure. Prior art magnetic shields, which have had generally rectangular configurations with sharp corners located near the ABS have exhibited strong concentration of magnetic flux near the ABS, which has resulted in magnetic fields being emitted from these corners toward a nearby magnetic medium. This has resulted in stray field writing and the complete erasure of magnetic signal from portions of the magnetic medium.

With continued reference to FIG. 5, the magnetic structure (shield) 500 has excellent resistance to stray field effects from both vertical and horizontal fields (ie perpendicular to and parallel with the ABS. The shield 500 has a generally rectangular body 502 having a depth D1 measured perpendicular to the ABS and a width W1 measured parallel to the ABS. This rectangular portion 502 serves as the functioning portion of the structure, for instance providing magnetic shielding for a read sensor 404 (FIG. 4) in the case where the structure 500 is a magnetic shield 406, 408, or conducting magnetic flux from the medium 424 in the case where the structure is a return pole 414. First and second laterally extending wings 506, 508 extend from the sides of the body 502 of the structure at the ABS 510.

With continued reference to FIG. 5, the wings 506, 508 have a depth measured perpendicular to the ABS that is less than ¼ of the depth D1 of the body 502. The depth D2 of the wings 506, 508 are preferably less than ⅛ the depth D1 of the body 502. The wings extend laterally to a distance W2 from the edge of the body 502 to the outer end 512 of each wing. The distance W2 by which each wing 506, 508 extends is preferably about equal to the width W1 of the body, plus or minus 20%. Although some other distance W2 may be found beneficial based on design considerations and may be used as well.

Each wing has a notch 514 that begins at a notch inner end, located a distance W3 from the respective side of the body 502. The distance W3 can vary based on design considerations, but is preferably about 5 to 50 percent of W1. The notch extends to the end 512 of the wing, and can be recessed a distance of about 1 um or 0.2-2.0 um from the ABS.

With reference still to FIG. 5, the unique configuration of the magnetic structure 500 effectively prevents excessive flux from accumulating at locations within the structure 502, thereby preventing stray field writing. As magnetic flux flows from the body 502 of the structure 500 toward the ABS 510, a portion of the flux is shunted to the wings 506, 508. If the wings 506, 608 were not present, the flux would accumulate at corners of the body 502 that would exist at the ABS 510. The flow of flux from the relatively large body 502 to the relatively small wing provides a flux choke point 516 which, due to its relatively small size is somewhat easily saturated. This flux choking causes a desired small amount of flux to leak out at the ABS at the location of the wing between the body 502 and the beginning of the notch 514.

It can be seen that the beginning of each notch 514 causes a corner 518 at the ABS. While this corner 518 in each wing might cause a flux concentration point which would contribute to stray field writing, the flux choking effect causes sufficient flux to leak out at the ABS that the remaining flux reaching the corners 518 does not present a problem with regard to stray field writing.

The notch 514 of each wing 506, 508 provides at least a couple of advantages. It can be seen that the end 512 of each wing 506, 508 has a corner 520 that could provide a flux concentration point. One advantage of the notch 514 is that it provides further flux restriction, and therefore provides additional flux choking effect for the remaining flux traveling toward the ends 512 of each wing 506, 508. This results in less flux reaching the end 512 and therefore reduces the flux concentration at the corners 520. Another advantage of the notch 514 is that it moves the corners 520 further away from the ABS. By moving the corners 520 away from the ABS, the effect on the medium of any flux concentration at the corners 520 is greatly reduced.

Figure 6:
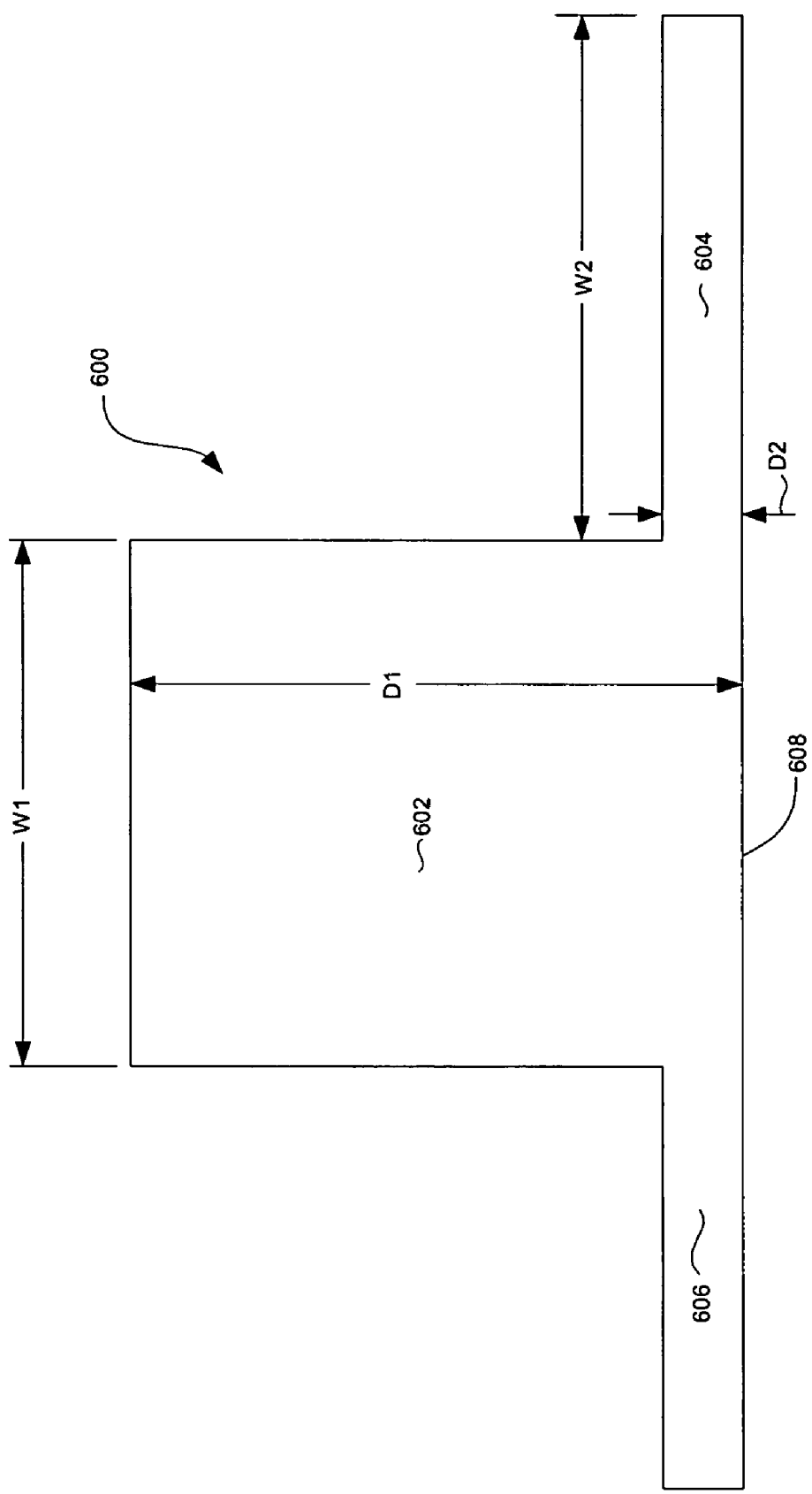
FIG. 6 is a view, similar to that of FIG. 5 of a magnetic structure according to an alternate embodiment of the invention.

With reference now to FIG. 6, an alternate embodiment of the invention includes a body portion 602 and un-notched wings 604, 606 that extend laterally from the body 602 at the ABS 608. The Body has a depth D1 measured perpendicular to the ABS and has a lateral width W1 measured parallel with the ABS. The wings 606, 608 each have a depth D2 and extend laterally a distance W2 from the body 602 to the end 610 of the wing 606, 608. Preferably, W2 is about equal to W1 plus or minus 20%, but can be some other length depending on design considerations. D2 is preferably less than ¼ of D1 and is more preferably less than ⅛ of D1.

The choice of whether to construct a structure 500 having notched wings 506, 508, or to construct a structure 600 having un-notched wings is a design choice that depends on the nature of the stray fields encountered. As mentioned above, several types of stray fields may be encountered. Some stray magnetic field from external sources may be predominantly oriented in a direction perpendicular to the ABS (ie. Vertical) whereas other stray magnetic fields may be oriented predominantly in a direction parallel with the ABS (ie. Horizontal) There may also be fields from the write coil that need to be taken into account.

The structure 500 disclosed with reference to FIG. 5, provides excellent flux concentration control in response to Fields both vertical and horizontal directions as well as from write coil fields. The structure described with reference to FIG. 6 provides superior flux control with regard to fields from the write coil and with regard to vertical magnetic fields, but exhibits slightly less flux control with regard to horizontal magnetic fields as compared with the structure described in FIG. 5. Therefore, the configuration to be chosen depends on the nature of the magnetic fields encountered.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic structure for use in a magnetic recording head having an air bearing surface (ABS), the magnetic structure comprising:

a body having an ABS end with an edge exposed at the ABS and a back end opposite the ABS and having a depth D1 measured perpendicular to the ABS from the ABS end to the back end, and having first and second laterally opposed side walls defining a width W1 measured parallel with the ABS;

first and second wing portions extending laterally from the first and second side walls of the body at the ABS end of the body, each of the first and second wings having a depth D2 measured perpendicular to the ABS and extending a lateral distance W2 from the body, the depth D2 being less than ¼ the distance D1; wherein each of the first and second wing portions has a front edge disposed toward the ABS that is substantially parallel with the ABS over the distance W2.

2. A structure as in claim 1, wherein W2 is equal to W1 plus or minus 20%.

3. A structure as in claim 1, wherein each of the first and second wings has an ABS edge that is exposed at the ABS and that extends from the body to the end of the wing.

4. A structure as in claim 1 wherein each of the wings has an ABS edge formed adjacent to the ABS, and wherein the ABS edge has a notched portion that is recessed from the ABS and an un-notched portion that is exposed at the ABS.

5. A structure as in claim 4 wherein each of the notched portions is recessed 0.2-2.0 um from the ABS.

6. A structure as in claim 4 wherein each of the notched portions is recessed about 1 um from the ABS.

7. A structure as in claim 1, wherein:

each wing has a notched portion that extends from a notch inner end to the outer end of the wing, the notched portion being recessed from the ABS;

each wing has an un-notched portion that extends from the body to the notch inner end, the un-notched portion being exposed at the ABS; and the notch inner end being located a distance W3, measured laterally from the respective side of the body, the distance W3 being equal to 5-50 percent of W1.

8. A structure as in claim 7 wherein the notched portion is recessed from the ABS by 0.2-2.0 um.

9. A structure as in claim 7 wherein the notched portion is recessed from the ABS by about 1 um.

10. A slider assembly comprising:
a slider body having an air bearing surface (ABS) and a trailing end surface perpendicular to and intersecting the air bearing surface.
a write element formed on the trailing end surface of the slider body;
a read element formed on the trailing end surface of the slider body;
at least one of the read or write elements including a magnetic structure comprising:
a body having an ABS end with an edge exposed at the ABS and a back end opposite the ABS and having a depth D1 measured perpendicular to the ABS from the ABS end to the back end, and having first and second laterally opposed side walls defining a width W1 measured parallel with the ABS;
first and second wing portions extending laterally from the first and second side walls of the body at the ABS end of the body, each of the first and second wings having a depth D2 measured perpendicular to the ABS and extending a lateral distance W2 from the body, the depth D2 being less than ¼ the distance D1;
is substantially parallel with the ABS over the distance W2.

11. A slider assembly as in claim 10, wherein W2 is equal to W1 plus or minus 20%.

12. A slider assembly as in claim 10, wherein each of the first and second wings has an ABS edge that is exposed at the ABS and that extends from the body to the end of the wing.

13. A slider assembly as in claim 10 wherein each of the wings has an ABS edge formed adjacent to the ABS, and wherein the ABS edge has a notched portion that is recessed from the ABS and an un-notched portion that is exposed at the ABS.

14. A slider assembly as in claim 13 wherein each of the notched portions is recessed 0.2-2 um from the ABS.

15. A slider assembly as in claim 13 wherein each of the notched portions is recessed about 1 um from the ABS.

16. A slider assembly as in claim 10, wherein:
each wing has a notched portion that extends from a notch inner end to the outer end of the wing, the notched portion being recessed from the ABS;
each wing has an un-notched portion that extends from the body to the notch inner end, the un-notched portion being exposed at the ABS; and
the notch inner end being located a distance W3, measured laterally from the respective side of the body, the distance W3 being equal to 5-50 percent of W1.

17. A slider assembly as in claim 16 wherein the notched portion is recessed from the ABS by 0.2-2.0um.

18. A slider assembly as in claim 16 wherein the notched portion is recessed from the ABS by about 1 um.

19. A magnetic data recording system, comprising:
a magnetic medium;
an actuator;
a suspension connected with the actuator;
a slider assembly connected with the suspension for movement adjacent to a surface of the magnetic medium;
a magnetic read element connected with the slider assembly; and
a magnetic write element connected with the slider assembly;
at least one of the read and write elements comprising:
surface (ABS), the magnetic structure comprising:
a body having an ABS end with an edge exposed at the ABS and a back end opposite the ABS and having a depth D1 measured perpendicular to the ABS from the ABS end to the back end, and having first and second laterally opposed side walls defining a width W1 measured parallel with the ABS;
first and second wing portions extending laterally from the first and second side walls of the body at the ABS end of the body, each of the first and second wings having a depth D2 measured perpendicular to the ABS and extending a lateral distance W2 from the body, the depth D2 being less than ¼ the distance D1; wherein
each of the first and second wing portions has a front edge disposed toward the ABS that is substantially parallel with the ABS over the distance W2.

20. A magnetic data recording system as in claim 19, wherein W2 is equal to W1 plus or minus 20%.

21. A magnetic data recording system as m claim 19, wherein each of the first and second wings has an ABS edge that is exposed at the ABS and that extends from the body to the end of the wing.

22. A magnetic data recording system as in claim 19 wherein each of the wings has an ABS edge formed adjacent to the ABS, and wherein the ABS edge has a notched portion that is recessed from the ABS and an un-notched portion that is exposed at the ABS.

23. A magnetic data recording system as in claim 22 wherein each of the notched portions is recessed 0.2-2.0 um from the ABS.

24. A magnetic data recording system as in claim 22 wherein each of the notched portions is recessed about 1 um from the ABS.

25. A magnetic data recording system as in claim 19, wherein:
each wing has a notched portion that extends from a notch inner end to the outer end of the wing, the notched portion being recessed from the ABS;
each wing has an un-notched portion that extends from the body to the notch inner end, the un-notched portion being exposed at the ABS; and
the notch inner end being located a distance W3, measured laterally from the respective side of the body, the distance W3 being equal to 5-50 percent of W1.

26. A magnetic data recording system as in claim 25 wherein the notched portion is recessed from the ABS by 0.2-2.0 um.

27. A magnetic data recording system as in claim 25 wherein the notched portion is recessed from the ABS by about 1 um.

* * * * *